Patented Mar. 3, 1953

2,630,459

UNITED STATES PATENT OFFICE 2,630,459

CHLOROMETHYLATION

Harry R. Raterink, Drexel Hill, Pa., assignor to Rohm & Haas Company, Philadelphia, Pa., a corporation of Delaware No Drawing. Application June 6, 1950, Serial No. 166,541

14 Claims. (Cl. 260—651)

This invention concerns a method of chloromethylating alkylbenzenes in which the alkyl group contains at least seven carbon atoms. It comprises bringing together and reacting said alkylbenzene, formaldehyde, and chlorosulfonic acid in the presence of a primary alcohol.

Alkylbenzenes having a relatively large alkyl substituent require special methods for their successful chloromethylation. The usual problem is to introduce a chloromethyl group without leaving a large proportion of unreacted alkylbenzene or causing the formation of polychloromethylated products, diphenylmethanes, or resins in appreciable amounts. Separation of monochloromethyl alkylbenzenes from unreacted starting materials or by-products becomes increasingly difficult as the size of the alkyl group increases. It is, therefore, important to provide a method which can be directed largely to the desired products. It is also desirable to provide a method which permits use of simple reactants and, if desired, ready recovery of materials not consumed in the chloromethylation. While it is commonly desired to direct the reaction to monochloromethylation, there arise occasions when introduction of more than one chloromethyl group is desired. In such cases formation of resins is apt to occur in objectionable proportions by methods which have heretofore been shown in the art.

I have discovered that chloromethylation of alkylbenzenes in which the alkyl group contains at least seven carbon atoms can be satisfactorily accomplished with the use of a primary alcohol, formaldehyde, and chlorosulfonic acid. These materials may be mixed in several ways. The most generally suitable method requires the preparation of a reaction mixture of alcohol, formaldehyde, and chlorosulfonic acid and the combining of this mixture with the alkylbenzene. This hydrocarbon may be added to the mixture or the mixture may be added to the hydrocarbon. Another procedure is to mix alkylbenzene, formaldehyde, and alcohol and add chlorosulfonic acid thereto.

As alcohol there may be used any liquid, saturated, primary alcohol. It may be a simple monohydric alcohol, ROH, in which R is an alkyl group, preferably such group of one to eight carbon atoms. It may also be a glycol, such as ethylene glycol, diethylene glycol, trimethylene glycol, or butylene glycol, or a monoether thereof, such as methoxyethanol, ethoxyethanol, butoxyethanol, or ethoxyethoxyethanol. Polyhydric alcohols such as glycerol can also be used, usually without advantage. The saturated monohydric aliphatic alcohols, particularly those of one to five carbon atoms, provide an economical source of effective materials which are adapted to meet practically all requirements. Alcohols such as methyl, ethyl, propyl, butyl, isobutyl, sec.-butylcarbinol, and the like with primary alcoholic hydroxyl groups have been found particularly useful, although alcohols such as 2-ethyl butyl, hexyl, heptyl, octyl, 2-ethylhexyl, decyl, and even dodecyl have also been found to be effective in the reaction.

The formaldehyde is supplied to the mixture in a form free of or low in water. Thus, formaldehyde may be absorbed in a primary alcohol and the solution used. It is more convenient to suspend a revertible polymer of formaldehyde in the alcohol. Particularly with the larger alcohols it is desirable to add paraformaldehyde and stir the mixture for a short time before chlorosulfonic acid is added thereto. This step seems to exert a moderating influence in the reaction when chlorosulfonic acid is added. It seems evident that a complex is formed and that this is the active reagent in the chloromethylation reaction.

In the preparation of the reagent solution it is desirable to keep the temperature low. Temperatures of 0° to 50° C. have been found satisfactory. In the chloromethylation step proper temperatures may preferably be between 0° and 70° C. although temperatures somewhat lower and also higher can be used. If chiefly monocholoromethylation is desired, it is desirable to work in the lower half of this range.

It has been found that best results are obtained by observing certain ratios for the substances used in the reaction, but these ratios are not critical. For monochloromethylation a ratio of one to two moles of formaldehyde per mole of alkylbenzene generally gives a good result. The preferred ratio is from 1.25 to 1.75 moles of formaldehyde per mole of alkylbenzene. Higher ratios of formaldehyde to alkylbenzene are used when a higher degree of chloromethylation is required.

The ratios of formaldehyde to hydroxyl group of an alcohol to chlorosulfonic acid may desirably be varied from 1:1:1 to about 1:1.5:1.5. A very useful ratio with methyl or ethyl alcohol is 1:1.1:1.2, as about this ratio gives a homogeneous solution when paraformaldehyde, alcohol, and chlorosulfonic acid are mixed. There may, however, be used other and wider ratios of formaldehyde, alcohol, and chlorosulfonic acid. In some cases, for example, excess alcohol is useful as a solvent. If separation of layers occurs, the upper layer may be taken off or the whole mixture may be used.

The mixture of formaldehyde, alcohol, and chlorosulfonic acid is sufficiently stable to allow preparation of this reagent mixture in advance of the chloromethylation reaction with an alkylbenzene. Yet it is advisable, if the mixture is to be stored before use, to keep it cool. There is a slow evolution of hydrogen chloride. For example, a mixture which contained 16.2% of chlorine when prepared had a chlorine content of 15% after a week at 20°–25° C.

The alkylbenzenes which are reacted with formaldehyde alcohol, and chlorosulfuric acid have an alkyl substituent of 7 to 18 carbon atoms. The phenyl ring may also carry one or two other small alkyl groups or other inert substituents; the total number of carbon atoms in these groups not exceeding eight. The useful hydrocarbons may be summarized by the formula

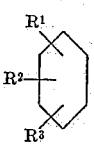

where $R^1$ is an alkyl group of 7 to 18 carbon atoms, and $R^2$ and $R^3$ represent hydrogen or alkyl groups up to octyl, but together not totaling more than eight carbon atoms.

The group $R^1$ may be straight or branched, primary, secondary, or tertiary. As is known, primary groups may be introduced through acylation of benzene, toluene, xylene, or other lower alkylated benzene, such as ethylbenzene, butylbenzene, amylbenzene, octylbenzene, methylbutylbenzene, methylhexylbenzene, or dibutylbenzene, followed by reduction of the carbonyl group. Secondary and tertiary hydrocarbon groups can be introduced by known methods into these or into similar phenyl hydrocarbons. There thus are available heptyl, octyl, nonyl, decyl, undecyl, dodecyl, tetradecyl, pentadecyl, hexadecyl, or octadecyl substituted benzenes or the corresponding lower alkylated benzenes. The relative positions of the various groups does not appear to be at all critical.

There follow examples of the preparation of typical hydrocarbons which are useful in yielding chloromethyl derivatives.

Example 1

Commercial 3-heptanol was dehydrated on an alumina catalyst at 400° C. to yield a mixture of 2-heptene and 3-heptene which was condensed and distilled.

There were mixed 125 parts of this product, 198 parts of benzene, and 196 parts of concentrated sulfuric acid while the mixture was stirred and held at 5° C. The mixture was stirred for three hours with the temperature of the mixture being allowed to advance above room temperature. Layers were permitted to form and the upper layer was taken. It was twice washed with sulfuric acid and distilled to yield 167 parts of heptylbenzene, probably a mixture of 2-heptyl-benzene and 3-heptylbenzene. The product had a carbon content of 87.3% and a hydrogen content of 11.7%, compared with theoretical values of 88.6% and 11.7% respectively.

Example 2

To a mixture of 138 parts by weight of toluene and 90 parts of anhydrous hydrogen fluoride, contained in a copper flask and held at 0°–10° C., there was added 336 parts of mixed octenes, boiling at 123°–134° C., at such a rate that the temperature did not rise above 10° C. The reaction mixture was stirred for an hour and then poured upon ice. The organic layer was separated, washed with water, with 5% sodium bicarbonate solution, and again with water, dried over calcium chloride, and finally distilled. Unreacted toluene and octene were removed and the organic liquid stripped by heating to 115° C./35 mm. There was then obtained a fraction between 135° C./35 mm. and 155° C./0.5 mm. which consisted essentially of octyltoluenes.

Example 3

Commercial diisobutyl carbinol was dripped slowly over a bed of alumina at 400° C. The vapors were taken off and condensed. Therefrom nonene was separated and distilled at 72°–75° C./100 mm. The product, containing by analysis 85.7% of carbon and 14.3% of hydrogen, was 2,6-dimethyl-3-heptene, for which the theoretical content of carbon is 85.8% and of hydrogen is 14.3%.

There was added 135 parts by weight of this product to a stirred mixture of 159 parts of benzene and 147 parts of sulfuric acid. The temperature was held between 0° and 10° C. After the mixture had been stirred for three hours, it was allowed to form layers. The upper layer was distilled and the distillate redistilled at 102°–106° C./3 mm. This distillate had a molecular weight of 203 (theory 204) and corresponded in composition to nonylbenzene. The yield was 95 parts.

Example 4

To a mixture of 184 parts of toluene and 103 parts of sulfuric acid there was added 112 parts of octene while the mixture was stirred and held at 5°–13° C. The octene had been prepared by dehydration of capryl alcohol on an alumina catalyst (cf. Komarewsky, Ulick, and Murray, J. Am. Chem. Soc., 67, 557 (1945)). The reaction mixture was stirred for three hours at room temperature, and the product layer was separated. It was washed twice with concentrated sulfuric acid and distilled. The fraction taken at 93°–95° C./0.3 mm. corresponded in composition to sec.-octylmethylbenzene.

Example 5

To a mixture of 312 parts of benzene and 180 parts of sulfuric acid was added dropwise at 10°–20° C. 281 parts of decene, which was freshly prepared by dehydration of n-decanol on alumina. The mixture was stirred for five hours at room temperature. It was then allowed to form layers. The upper layer was separated, washed with concentrated sulfuric acid twice, and distilled. The fraction distilling at 115°–127° C./1.3 mm. was identified as sec.-decylbenzene.

Example 6

Dodecyltoluene was prepared by mixing 344 parts of toluene and 294 parts of concentrated sulfuric acid and, while the mixture was stirred and the temperature maintained below 10° C., dodecylene was slowly added. The dodecylene used was a propylene tetramer. After 506 parts of dodecylene were added, the mixture was allowed to come to room temperature and stirring was continued for 24 hours. After separation from the acid layer, the product was washed with concentrated sulfuric acid and distilled in vacuo. Five hundred fifty-five parts of a colorless liquid boiling at 110°–160° C. at 1.2–2.2 mm. of mercury was obtained.

*Example 7*

To 86 parts of boron trifluoride monohydrate was added 156 parts of benzene and then over a period of 40 minutes at 5°–30° C., 252 parts of octadecylene (obtained by dehydration of octadecanol-1). The mixture was stirred for 3.5 hours and allowed to separate. The upper alkylate layer was washed with hot water and very dilute sodium hydroxide. Distillation gave 187.5 parts of colorless octadecylbenzene distilling at 184°–225° C./1 mm.

*Example 8*

To a mixture of 150 parts of sec.-butylbenzene and 128 parts of concentrated sulfuric acid at 5° C. was added with stirring 168 parts of propylene tetramer. The temperature was held to 20° C. during addition and then the mixture was stirred for five hours at room temperature. The hydrocarbon layer was separated, washed with concentrated sulfuric acid, and distilled from a few sodium hydroxide pellets to yield 157.4 parts of alkylated hydrocarbon boiling at 145°–158° C./1.5 mm. This was sec.-butyldodecylbenzene.

*Example 9*

To a mixture of 156 parts of benzene and 120 parts of anhydrous hydrogen fluoride was added 448 parts of mixed octenes, which were mainly octene-2, at such a rate that the temperature was held below 10° C. Stirring was continued for two hours more. The product was then poured onto a large amount of ice. The hydrocarbon layer was washed with water and dilute sodium bicarbonate solution, dried, and distilled under vacuum. In this way there was obtained 372 parts of monooctylbenzene boiling at 148°–175° C./40–55 mm. having a molecular weight ebullioscopically of 190 (theory 190), a small intermediate fraction and 149 parts of dioctylbenzene boiling at 145°–188° C./1 mm. having a molecular weight of 297 (theory 302).

*Example 10*

Boron trifluoride gas was slowly bubbled into 18 parts of water over a 45 minute period at a temperature below 30° C. The weight increase of this solution showed absorption of 68 parts of boron trifluoride. To 86 parts of this catalyst in 117 parts of benzene was added dropwise 126 parts of propylene trimer with good agitation. Reaction was carried on for two hours at 25°–30° C. The catalyst was then separated and the oil layer was washed and distilled under low pressure at 127°–152° C./27 mm. The product was nonylbenzene.

*Example 11*

A mixture of 250 parts of commercial xylene and 150 parts of anhydrous hydrogen fluoride was cooled to 0° C. and 322 parts of an olefin prepared by polymerization of propylene and containing four propylene units (thus corresponding to dodecylene) was added slowly keeping the temperature at 2°–4° C. A copper vessel equipped with copper stirrer and thermometer well was used for the reaction. After addition was complete the reaction mixture was poured on ice and the hydrocarbon layer separated. This layer was then washed with water and then with a 5% sodium bicarbonate solution, dried over anhydrous calcium chloride, and distilled in vacuo to yield 342 parts of the alkylated xylene distilling at 128°–160° C. at 0.5 to 1.5 mm. of mercury but mainly at 135°–140° C. at 0.5 mm. A molecular weight determination (ebullioscopic) gave the value of 274, theory for dodecylxylene, 271.

By similar methods other alkylbenzenes may be prepared in which there is an alkyl group of at least seven carbon atoms. Such an alkylbenzene is reacted with the formaldehyde, alcohol, chlorosulfonic acid mixture or is mixed with alcohol and formaldehyde and chlorosulfonic acid is added to the latter mixture.

After the resulting chloromethylation reaction has taken place to a desired extent, as may be determined by tests, as through chloride analysis, the reaction mixture is allowed to stand. Usually layers form promptly. Sulfuric acid and alkylsulfuric acid form a dark lower layer. If considerable charring of the organic layer has occurred, however, separation may be not so readily effected. In such case, it is advisable to drown the product in excess cold water or pour the product onto ice. The organic layer can then be more readily separated. In either case the organic layer is washed with hot water and with sodium bicarbonate or other neutralizing solution. The product is obtained as a colored oil. With alkyl substituents up to about 14 or 15 carbon atoms the product can be further purified by distillation at low pressure. With more carbon atoms in the substituent groups distillation by high vacuum techniques may be used. Yet for many purposes, including reaction of the chloromethyl compound with secondary amines to give tertiary amines, or reaction with tertiary amines to give quaternary salts, or the reaction with alcohols in the presence of alkalies to give ethers, the chloromethyl products can be used without distillation.

In the following examples, which are given to show typical preparations of chloromethylated alkylbenzenes according to the method of this invention, the alkylbenzene and the reagent formed by mixing formaldehyde, alcohol, and chlorosulfonic acid are combined and the product isolated.

*Example 12*

(a) A mixture was prepared from 126.4 parts of paraformaldehyde and 128 parts of methanol. This was cooled to 10° C. With good stirring and cooling there was slowly added chlorosulfonic acid in an amount of 582.4 parts. The period of addition was 45 minutes and during this time the temperature of the mixture was kept below 30° C. It was then stirred for two hours at 20°–30° C., a light yellow, practically homogeneous solution resulting.

(b) To 70.4 parts of heptylbenzene, prepared as described above, there was added over a 30 minute period with stirring and cooling 112 parts of the mixture prepared in part (a) of this example. During this time the temperature of the reaction mixture was kept at 10°–15° C. The resulting mixture was then stirred for three hours with the temperature of the mixture held between 3° and 14° C. Layers were then allowed to form. The lower layer was withdrawn and discarded. The oil layer was washed with water, dilute sodium bicarbonate solution, and hot water. The yield of crude chloromethylate was 82 parts.

This crude product was purified by distillation. After a small forerun there was obtained at 111°–

127° C./1.2 mm. fraction which corresponded in composition to heptylbenzyl chloride. There was then obtained at 127°–145° C./1.2 mm. 6.5 parts of distillate which upon analysis proved to be dichloromethylheptylbenzene. There remained 38.5 parts of residue.

The residue here was chiefly bis(heptylphenyl)methane, some of which was chloromethylated. A residue of corresponding composition was similarly obtained, although in lesser proportion, in the preparation of octylbenzyl chloride. With smaller alkylbenzenes, on the other hand, more of the products formed are of the diphenylmethane type. For example, in the chloromethylation of butylbenzene the chief products were bis(butylphenyl)methanes and resins with only 7% of butylbenzyl chloride resulting by the above procedure.

Example 13

To 88.2 parts of octylbenzene (prepared as described above) there was slowly added 130 parts of a mixture prepared as in Example 12 (a). The temperature was kept at 13°–20° C. during the addition and at 20° C. for four hours while the reaction mixture was stirred. It was then left standing to permit formation of layers. The oil layer was taken, washed with water and sodium bicarbonate solution, and distilled. At 117°–136° C./1 mm. there was obtained a fraction which was identified as octylbenzyl chloride. The residue amounted to 26.7 parts and was chiefly the methane derivative.

Example 14

To 143 parts of a nonylbenzene there was slowly added at 6°–13° C. 183 parts of the reagent solution prepared as in Example 12 (a). The resulting mixture was stirred for two hours at 10° C. The reaction mixture was allowed to form layers, which were separated. The organic layer was washed as above and distilled. After 35 parts of nonylbenzene had been taken off along with some nonylbenzyl chloride, a fraction of 96.2 parts of practically pure nonylbenzyl chloride was taken at 120°–135° C./0.6 mm. There remained a residue of 39.5 parts which contained 4% of chlorine.

Example 15

The reaction was carried out as in the previous example with 83.5 parts of 2-octylbenzene and 88 parts of a formaldehyde, methanol, chlorosulfonic acid mixture. The temperature of reaction was here 25°–30° C. The organic layer, after separation and washing gave 60.5 parts of octylbenzyl chloride on distillation. There were also obtained 4.5 parts of the dichloromethyl compound and 24 parts of residue.

Example 16

To 65 parts of commercial dodecyltoluene at −1° C. to 2° C. there was added 89 parts of the reagent solution prepared as in Example 12 (a). The reaction mixture was stirred for five hours while it was held at 0° to 2° C. The reaction mixture was then separated and the organic layer washed with hot water. The crude product was dried and distilled. A yield of 75% of methyldodecylbenzyl chloride was obtained at 155°–175° C./1 mm. It contained by analysis 11.8% of chlorine (theory 11.5%).

Example 17

There were reacted 65 parts of dodecyltoluene and 81 parts of the reagent solution from formaldehyde, methanol, and chlorosulfonic acid in a 1:1.1:1.25 ratio. The temperature of the reacting mixture here, however, was held at 60° C. The reaction product was poured into an excess of cold water and the organic layer collected. It was washed, and dried, to give a crude chloromethylation product which contained 14% of chlorine. It was then distilled. The yield of monochloromethylated product was 73%. It was taken at 162°–169° C./0.4 mm.

Example 18

To 73.5 parts of octadecylbenzene there was added 83.8 parts of the reagent, prepared as in Example 12 (a), with the temperature kept at about 35° C. for 20 minutes. The resulting mixture was then stirred for four hours. Layers were formed and separated. The upper layer was washed with hot water and dilute sodium bicarbonate solution. It was dried by being heated under low pressure. The material resulting corresponded nearly in composition to octadecylbenzyl chloride.

In the same way there were reacted the reagent from mixing paraformaldehyde, methanol, and chlorosulfonic acid with tetradecylbenzene. The washed and dried organic layer corresponded in composition to tetradecylbenzyl chloride.

Example 19

To 61.2 parts of sec.-butyldodecylbenzene there was added 76.3 parts of reagent similar to that prepared in Example 12 (a) while the temperature was kept at 30°–35° C. The mixture was then kept at 45°–50° C. and stirred for five hours. It was then allowed to form layers, which were separated. The upper layer was washed with water, sodium carbonate solution, and hot water. It was then dried. There was thus prepared an amber oil in an amount of 62 parts which corresponded very closely in composition with that of butyldodecylbenzyl chloride.

Example 20

To 75.5 parts of diocetylbenzene at 30° C. there was rapidly added 94 parts of a formaldehyde, methanol, chlorosulfonic mixture. The mixture was stirred four hours at 40°–50° C. The upper layer was collected, washed, and dried. It was identified as dioctylbenzyl chloride. The yield was 94%.

Example 21

(a) There were mixed with stirring 40.8 parts of n-butanol and 15.8 parts of paraformaldehyde. The mixture was stirred at room temperature for 1.5 hours. This procedure seemed to help in the formation of the reagent or reactive complex formed by decreasing what appears as a side reaction of sulfation. With this mixture at 25° C. there was added 73 parts of chlorosulfonic acid over a two hour period.

(b) To 129 parts of the above reagent solution there was added dodecyltoluene in an amount of 81.5 parts over a one hour period. This mixture was then stirred for four hours at 35° C. It was allowed to form layers, which were separated. The upper layer was washed and dried to give 90 parts of methyldodecylbenzyl chloride.

Example 22

(a) There was suspended 15.8 parts of paraformaldehyde in 44.8 parts of a mixture of 80% of isobutanol and 20% of n-butanol and the suspension was stirred for an hour at 15° C. There was then slowly added with stirring 73 parts of chlorosulfonic acid with the temperature kept at 15° C. This gave a light brown solution.

(b) This solution was mixed with 81.5 parts of dodecyltoluene at 20° C. The resulting mixture was stirred for four hours at 40° C. and worked up as above. The product amounted to 89.5 parts of methyldodecylbenzyl chloride.

Example 23

The procedure of Example 22 was followed with 15.8 parts of formaldehyde, 54 parts of sec.-butylcarbinol, 73 parts of chlorosulfonic acid, and 81.5 parts of dodecyltoluene. There was obtained 93 parts of crude product from which there was distilled 55 parts of methyldodecylbenzyl chloride. This product boiled at 150° C./1 mm.

Example 24

To 31.5 parts of paraformaldehyde in 34 parts of ethylene glycol (1 mole of aldehyde to 0.55 mole of glycol) which had been stirred for an hour there was added at 25° C. over a two hour period 146 parts of chlorosulfonic acid. The mixture was stirred and cooled during this time. There was then run into this solution 125.5 parts of octylbenzene. The resulting mixture was stirred for three hours at room temperature. The reaction mixture was separated in the usual way. From the organic layer upon distillation there were obtained 19 parts of unreacted hydrocarbon, 88 parts of octylbenzyl chloride, distilling at 115°–130° C./1.5 mm. a small fraction of higher chloromethylated product, and a residue of 22.5 parts.

The above procedure was repeated with substitution of diethylene glycol for ethylene glycol. The product obtained was likewise octylbenzyl chloride.

Example 25

To 67.5 parts of dodecylxylene, prepared as in Example 11, there was added 76.3 parts of the formaldehyde-methanol-chlorosulfonic acid reagent at 30°–35° C. over a half hour period. After four hours of stirring at 40° C., the mixture was allowed to separate and the upper product layer was washed and dried to yield 68 parts of an amber oil. Analysis of this oil for chlorine indicated that it was essentially the monochloromethylation product, dodecyldimethylbenzyl chloride.

A different order of combining the components which are used in the chloromethylation reaction by the method of this invention is shown in the following examples.

Example 26

There were mixed 163 parts of dodecyltoluene, 31.6 parts of paraformaldehyde, and 40 parts of methanol. This mixture was cooled to 0° C. and while it was kept at this temperature by cooling, there was added over a 1.5 hour period 146 parts of chlorosulfonic acid. Stirring was continued while the reaction mixture was held at 20° C. for three hours and then left standing over night. The mixture was dark colored. The layers were nevertheless separated and the upper layer was washed with water and sodium bicarbonate solution. There was thus obtained 116.5 parts of crude product which contained by analysis 11.75% of chlorine. The crude product was distilled. The fraction collected at 156°–179° C./1–3 mm. contained 11.7% of chlorine and was methyldodecylbenzyl chloride. The residue was chiefly a condensation product. It contained 5.4% of chlorine.

Example 27

There were mixed 81.6 parts of n-butanol, 31.6 parts of formaldehyde, and 163 parts of dodecyltoluene. While the mixture was held at 20° C., there was added over a 1.5 hour period 146 parts of chlorosulfonic acid. The reaction mixture was then stirred for four hours. The mixture was left standing over night to form layers which were separated. After steps of washing and drying there was obtained a crude product of 135 parts. This was distilled. At 167°–180° C./1 mm. there was obtained a product which corresponded approximately in composition to methyldodecylbenzyl chloride. This material contained 11.4% of chlorine. The yield of distilled product was 55%.

The method here shown for the chloromethylation of alkylbenzenes depends upon the formation of an intermediate or complex from formaldehyde, alcohol, and chlorosulfonic acid. That all three of these materials are necessary was shown by attempts to use only formaldehyde and chlorosulfonic acid. No positive results were obtained with this combination and it was evident that the reaction product of paraformaldehyde and chlorosulfonic acid was unsuitable for the chloromethylation of alkylbenzenes.

For practical results the alkylbenzene must be at least as large as heptylbenzene as below this size of hydrocarbon the reaction leads chiefly to condensation and resin formation. Apparently, any saturated alcohol having a primary hydroxyl group can be used. The preferred alcohols are those having an alkyl group of not over eight carbon atoms, represented by the formula ROH, R being a saturated monovalent aliphatic hydrocarbon group. Of these the alcohols with such groups up to five carbon atoms usually meet all requirements. Methanol and ethanol are economical in most situations. In addition to this preferred class of alcohols ethylene glycol may be used with particular advantage since it has a low equivalent weight and possesses other desirable qualities. The formaldehyde is most conveniently supplied from paraformaldehyde, of which the 90% to 95% grades of commerce have been found quite satisfactory. The paraformaldehyde is suspended in the alcohol. Upon addition of chlorosulfonic acid a clear, though colored, solution is ordinarily obtained.

The method is a highly desirable one for the chloromethylation of higher alkylated benzenes. It is economical and relatively efficient. It avoids use of hydrogen chloride gas and the isolation of special intermediates, such as dichloromethyl ether. It requires the use of only relatively inexpensive reagents in a simple and convenient procedure with good results.

I claim:

1. A process of chloromethylating alkylbenzenes which comprises mixing together and reacting between 0° and 70° C. formaldehyde, a liquid saturated primary alcohol consisting of at least one functional hydroxyl group and a hydrocarbon residue, chlorosulfonic acid, and an alkylbenzene,

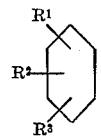

wherein $R^1$ is an alkyl group of at least seven carbon atoms and $R^2$ and $R^3$ are members of the class consisting of hydrogen and alkyl groups of not over eight carbon atoms, the total number of carbon atoms which may be present in R² and R³ together not exceeding eight, and separating the chloromethylated alkylbenzene.

2. A process of chloromethylating alkylbenzenes which comprises mixing and reacting together between about 0° and 70° C. formaldehyde, a liquid primary alcohol having the functional hydroxyl group attached to a saturated aliphatic hydrocarbon group, chlorosulfonic acid, and an alkylbenzene,

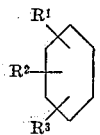

wherein R¹ is an alkyl group of at least seven carbon atoms and R² and R³ are members of the class consisting of hydrogen and alkyl groups of not over eight carbon atoms, the total number of carbon atoms which may be present in R² and R³ together not exceeding eight, and separating the chloromethylated alkylbenzene.

3. A process of chloromethylating alkylbenzenes which comprises mixing and reacting together between about 0° and 70° C. paraformaldehyde, a primary alcohol, ROH, wherein R is an alkyl group of not over eight carbon atoms, chlorosulfonic acid, and an alkylbenzene,

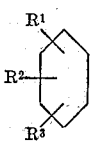

wherein R¹ is an alkyl group of at least seven carbon atoms and R² and R³ are members of the class consisting of hydrogen and alkyl groups of not over eight carbon atoms, the total number of carbon atoms which may be present in R² and R³ together not exceeding eight, and separating the chloromethylated alkylbenzene.

4. A process of chloromethylating alkylbenzenes which comprises mixing together between 0° and 50° C. paraformaldehyde, a primary alcohol, ROH, wherein R is an alkyl group of not over five carbon atoms, and chlorosulfonic acid, reacting the resulting mixture between 0° and 70° C. with an alkylbenzene, and separating chloromethylated alkylbenzene, the alkylbenzene used having the formula

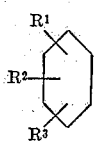

wherein R¹ is an alkyl group of 7 to 18 carbon atoms and R² and R³ are members of the class consisting of hydrogen and alkyl groups of not over eight carbon atoms, the total number of carbon atoms in R² and R³ together not exceeding eight in number.

5. A process for chloromethylating alkylbenzenes which comprises mixing together between 0° and 50° C. paraformaldehyde, a primary alcohol, ROH, wherein R is an alkyl group of not over five carbon atoms, and chlorosulfonic acid, the proportions of these three materials being within the ratios 1:1:1 and 1:1.5:1.5, reacting the mixture thereof at a temperature between 0° and 70° C. with an alkylbenzene, and separating a monochloroalkylbenzene, the alkylbenzene used having the formula

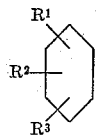

wherein R¹ is an alkyl group of 7 to 18 carbon atoms and R² and R³ are members of the class consisting of hydrogen and alkyl groups of not over eight carbon atoms, the total number of carbon atoms in R² and R³ together not exceeding eight in number, 6. The process of claim 5 wherein the mole ratio of paraformaldehyde used in the mixture to the alkylbenzene is 1.25:1 to 1.75:1.

7. The process of claim 5 in which the alcohol is methanol.

8. The process of claim 5 in which the alcohol is ethanol.

9. A process for chloromethylating dodecyltoluene which comprises mixing together between 0° and 50° C. paraformaldehyde, a primary alcohol, ROH, wherein R is an alkyl group of not over five carbon atoms, and chlorosulfonic acid, the proportion of these three materials being within the ratios 1:1:1 and 1:1.5:1.5, reacting the resulting mixture with dodecyltoluene at a temperature between 0° and 70° C., and separating methyldodecylbenzyl chloride, the mole ratio of paraformaldehyde taken in the mixture to dodecyltoluene being from 1:1 to 2:1.

10. A process for chloromethylating octylbenzene which comprises mixing together between 0° and 50° C. paraformaldehyde, a primary alcohol, ROH, wherein R is an alkyl group of not over five carbon atoms, and chlorosulfonic acid, the proportion of these three materials being within the ratios 1:1:1 and 1:1.5:1.5, reacting the resulting mixture with octylbenzene at a temperature between 0° and 70° C., and separating octylbenzyl chloride, the mole ratio of paraformaldehyde taken in the mixture to octylbenzene being from 1:1 to 2:1.

11. A process for chloromethylating tetradecylbenzene which comprises mixing together between 0° and 50° C, paraformaldehyde, a primary alcohol, ROH, wherein R is an alkyl group of not over five carbon atoms, and chlorosulfonic acid, the proportion of these three materials being within the ratios 1:1:1 and 1:1.5:1.5, reacting the resulting mixture with tetradecylbenzene at a temperature between 0° and 70° C., and separating tetradecylbenzyl chloride, the mole ratio of paraformaldehyde taken in the mixture to tetradecylbenzene being from 1:1 to 2:1.

12. A process for chloromethylating alkylbenzenes which comprises reacting by mixing together between about 0° and 70° C. paraformaldehyde, ethylene glycol, chlorosulfonic acid, and an ankylbenzene

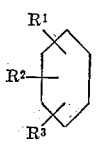

wherein R¹ is an alkyl group of at least seven carbon atoms and R² and R³ are members of the class consisting of hydrogen and alkyl groups of not over eight carbon atoms, the total number of carbon atoms which may be present in R² and $R^3$ together not exceeding eight, and separating the chloromethylated alkylbenzene.

13. A process for chloromethylating alkylbenzenes which comprises mixing together between about 0° and 50° C. paraformaldehyde, ethylene glycol, and chlorosulfonic acid, reacting the resulting mixture between about 0° and 70° C. with an alkylbenzene, and separating chloromethylated alkylbenzene, the alkylbenzene used having the formula

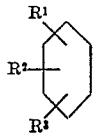

wherein $R^1$ is an alkyl group of 7 to 18 carbon atoms and $R^2$ and $R^3$ are members of the class consisting of hydrogen and alkyl groups of not over eight carbon atoms, the total number of carbon atoms in $R^2$ and $R^3$ together not exceeding eight in number.

14. The process of claim 13 in which the alkylbenzene is dodecyltoluene.

HARRY R. RATERINK.

REFERENCES CITED

The following references are of record in the file of this patent:

UNITED STATES PATENTS

| Number | Name | Date |
|---|---|---|
| 2,166,554 | Roblin et al. | July 18, 1939 |
| 2,219,873 | Pinkernelle | Oct. 29, 1940 |
| 2,304,537 | Cambron | Dec. 8, 1942 |

FOREIGN PATENTS

| Number | Country | Date |
|---|---|---|
| 492,021 | France | June 26, 1919 |
| 500,912 | Germany | June 26, 1930 |
| 533,132 | Germany | Sept. 9, 1931 |

OTHER REFERENCES

Stephen et al.: "Jour. Chem. Soc.," 1920, pp. 510–29.

Adams: "Organic Reactions," vol. I, pp. 66–7 (1942).